United States Patent
Nguyen et al.

(10) Patent No.: US 10,721,509 B2
(45) Date of Patent: Jul. 21, 2020

(54) COMPLEX SYSTEM ARCHITECTURE FOR SENSATORY DATA BASED DECISION-PREDICTIVE PROFILE CONSTRUCTION AND ANALYSIS

(71) Applicant: Accenture Global Solutions Limited, Dublin (IE)

(72) Inventors: David Tong Nguyen, Newark, CA (US); Paul Justin Mahler, San Jose, CA (US)

(73) Assignee: Accenture Global Solutions Limited, Dubliln (IE)

( * ) Notice: Subject to any disclaimer, the term of this patent is extended or adjusted under 35 U.S.C. 154(b) by 733 days.

(21) Appl. No.: 15/220,877

(22) Filed: Jul. 27, 2016

(65) Prior Publication Data

US 2018/0032899 A1 Feb. 1, 2018

(51) Int. Cl.
| | | |
|---|---|---|
| *G06N 99/00* | (2019.01) | |
| *G06N 5/02* | (2006.01) | |
| *H04N 21/25* | (2011.01) | |
| *H04N 21/234* | (2011.01) | |
| *H04N 21/84* | (2011.01) | |
| *H04N 21/4788* | (2011.01) | |
| *H04N 21/258* | (2011.01) | |
| *G06Q 30/02* | (2012.01) | |

(Continued)

(52) U.S. Cl.
CPC ......... *H04N 21/252* (2013.01); *G06Q 10/04* (2013.01); *G06Q 30/0201* (2013.01); *G06Q 30/0202* (2013.01); *G06Q 30/0242* (2013.01); *G06Q 50/01* (2013.01); *G06Q 50/12* (2013.01); *H04N 21/23418* (2013.01); *H04N 21/25866* (2013.01); *H04N 21/4788* (2013.01); *H04N 21/84* (2013.01)

(58) Field of Classification Search
CPC .............. G06Q 30/02; G06Q 30/0242; G06Q 30/0201; G06Q 30/0202; G06Q 10/04; G06Q 50/01; G06Q 50/12; H04N 21/23418; H04N 21/84; H04N 21/25866; H04N 21/4788; H04N 21/252
USPC ......................................................... 706/12
See application file for complete search history.

(56) References Cited

U.S. PATENT DOCUMENTS 5,848,396 A    12/1998  Gerace
7,043,433 B2*  5/2006   Hejna, Jr. ................ G09B 5/00
                                                 704/211

(Continued)

OTHER PUBLICATIONS

Notice of Allowance in U.S. Appl. No. 14/835,187, including Notice of References, dated Sep. 25, 2018, pp. 1-9.

*Primary Examiner* — Kuen S Lu
(74) *Attorney, Agent, or Firm* — Brinks Gilson & Lione

(57) ABSTRACT

A computer system constructs a decision-predictive recipient profile using sensatory data tied to an online profile of a recipient. After obtaining base sensatory data tied to the online profile of the recipient, the system may filter the base sensatory data by searching the base sensatory data for one or more machine-cognizable characteristics. The filtered sensatory data may be provided to an execution group, which may review displays of the sensatory data. Responsive to the displays of the sensatory data, the execution group may generate descriptors of the content of the filtered sensatory data and send the descriptors to the system. The system may process the descriptors to generate or augment the decision-predictive recipient profile.

20 Claims, 10 Drawing Sheets

(51) Int. Cl.
*G06Q 50/12* (2012.01)
*G06Q 50/00* (2012.01)
*G06Q 10/04* (2012.01)

(56) References Cited

U.S. PATENT DOCUMENTS

| | | |
|---|---|---|
| 8,538,786 B2 | 9/2013 | Linehan |
| 2009/0132345 A1 | 5/2009 | Meyssami et al. |
| 2009/0265224 A1 | 10/2009 | Tarr et al. |
| 2012/0290950 A1* | 11/2012 | Rapaport ................ H04L 51/32 715/753 |
| 2013/0185153 A1 | 7/2013 | Howcroft |
| 2014/0136105 A1 | 5/2014 | Chakraborty et al. |
| 2014/0351098 A1 | 11/2014 | Shafer et al. |
| 2016/0171509 A1 | 6/2016 | Fanous et al. |
| 2017/0364503 A1* | 12/2017 | Anisimovich ........ G06F 17/278 |

\* cited by examiner

COMPLEX SYSTEM ARCHITECTURE FOR SENSATORY DATA BASED DECISION-PREDICTIVE PROFILE CONSTRUCTION AND ANALYSIS

TECHNICAL FIELD

This disclosure relates to a complex system architecture and analytics engine for building, developing, and applying decision-predictive recipient profiles to real-world solutions. This disclosure also relates to image capture and processing.

DETAILED DESCRIPTION

Figure 1:
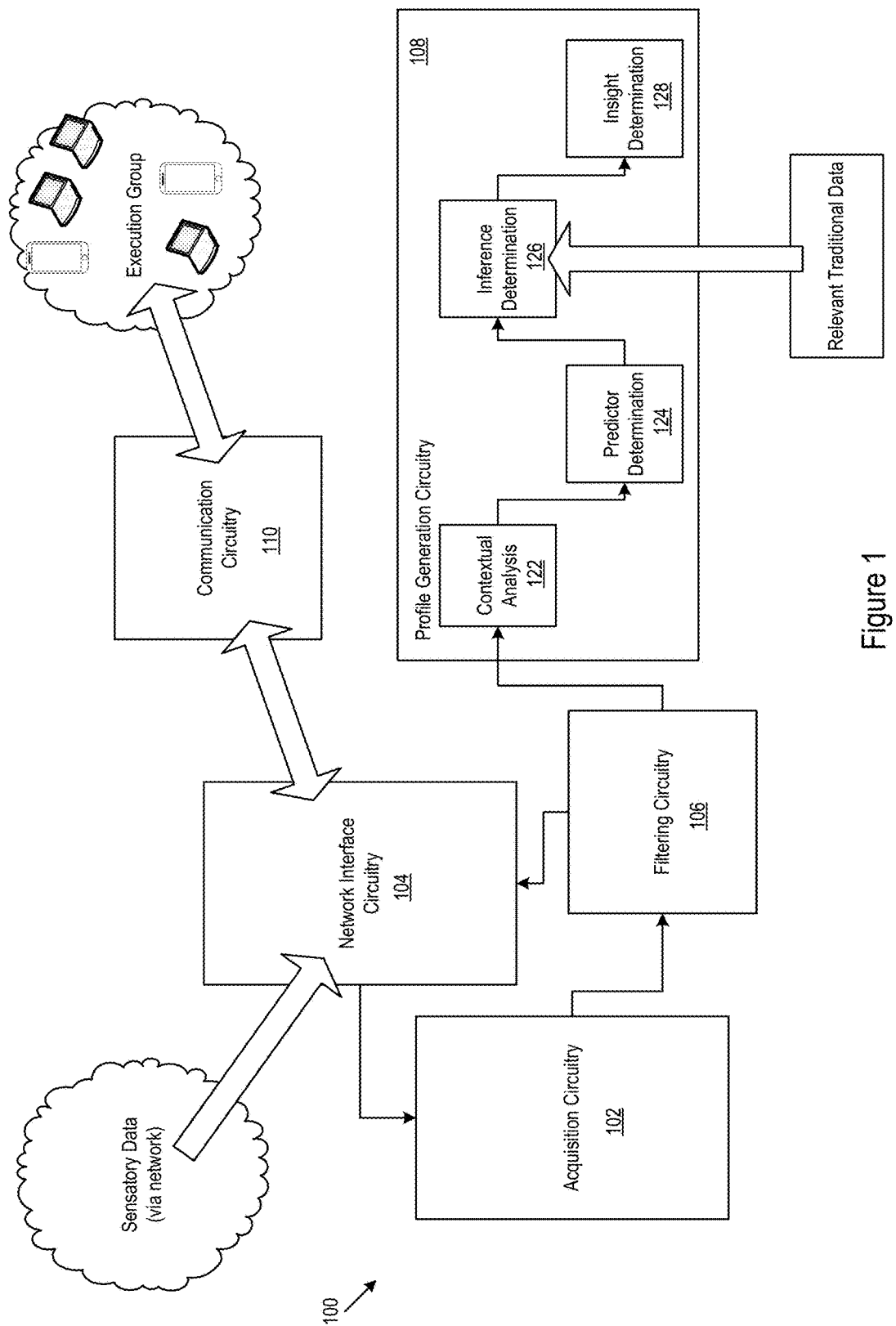
FIG. 1 shows example profile circuitry.

Enterprises may acquire information related to past actions or interests of recipients or potential recipients of offerings by the enterprise. However, the information may be available in a format resistant to machine-cognizability, such as sensatory data. For example, the sensatory data may include audiovisual data, such as image files, video files, audio files; tactile feedback response patterns; or other data used to generate displays targeted for human senses. In some cases, sensatory data may include machine-cognizable characteristics such as recognizable facial features, logos, watermarks, colors, spoken words amenable to voice-recognition, or other machine-cognizable characteristics. The base or raw sensatory data may be filtered, at least in part, by performing a search for one or more machine-cognizable characteristics within the content of the sensatory data to generate result sensatory data. The result sensatory data from multiple searches may be combined to generate the filtered sensatory data. Additionally or alternatively, filtering may be performed using metadata or other contextual data attached to the sensatory data. The filtered sensatory data may be distributed to an execution group processing system, such as a group of workstations controlled by operators retained to provide human oversight of the workstation electronic processing or human review of sensatory data.

Filtering the sensatory data may allow the volume of the sensatory data to be reduced to a level where review by an execution group of the sensatory data may be possible or less costly than reviewing the base sensatory data without filtering. Hence, the techniques and architectures discussed below may be, for example, particularized to scenarios involving sensatory data accessible through data center or internet connectivity. For example, images, audio, and video that may be posted on social media platforms, such as Facebook®, Instagram®, Google+®, Pinterest®, Twitter®, LinkedIn®, or other social media platforms may provide enterprise access to such sensatory data posted by users of the platforms. However, in some cases the volume of media posted on social media platforms may exceed the human review capacity of a particular investigating enterprise. Additionally or alternatively, the marginal cost of human review of a sensatory data file may exceed that of electronically reviewing the sensatory data file for relevant machine-cognizable search characteristics. Accordingly, filtering sensatory data for relevance to particular user interests or product preferences may assist in holding the amount of sensatory data designated for review by an execution group to levels conducive to such review.

Once the filtered sensatory data is distributed to the execution group system, the execution group may process the sensatory data and return descriptors regarding the content of the sensatory data. The descriptors may include descriptions of product versions, emotional dispositions of subjects, activities depicted, services used, or other descriptions of the content of the sensatory data. For example, for a tactile feedback pattern, such as a series of vibrations, temperatures, or other tactile pattern, the descriptors may include accounts to perceived intensity of the pattern, positive or negative impressions left by the pattern, specific meanings communicated by the pattern, or other perceptions. Once the descriptors are received from the execution group the system may use the descriptors to generate tags, which may be added to build, enrich or augment a profile for the recipient.

FIG. 1 shows example profile circuitry 100 which may be used to generate a decision-predictive profile for a recipient. The example profile logic 100 may include acquisition circuitry 102. The acquisition circuitry 102 may determine base sensatory data attached to an online footprint of the recipient for which the profile circuitry 100 is generating or augmenting a recipient profile. The online footprint of a recipient may include social media or other online accounts maintained by the recipient. Additionally or alternatively, the online footprint of a recipient may include information related to online activities of a recipient such as search histories, browsing histories, social media interactions, such as tagging being tagged, viewing histories, or profile information captured through interaction with internet-based service providers, such as Google, Amazon, Yahoo, Facebook, or other internet-based service providers. Additionally or alternatively, a recipient's online footprint may include information available online about a recipient whether related to online activities of the recipient or not. For example, online footprint may include arrest records, news articles, credit reports, civil compliant histories, real estate purchase histories, or information available through third-party business intelligence services. The acquisition circuitry 102 may determine the base sensatory data attached or tied to the recipient's online footprint by scraping sensatory data associated with the various online footprint information sources discussed above. In many cases, online footprint information sources may include a mix of machine-cognizable data and sensatory data. The acquisition circuitry 102 may use the machine-cognizable data to determine that a particular source is part of the online footprint of a particular recipient. Then, the acquisition circuitry 102 may tie the sensatory data from that source to the online footprint of the recipient. The acquisition circuitry 102 may access the determined base sensatory data, for example, through network interface circuitry 104. Once accessed, the acquisition circuitry may pass the base sensatory data to filtering circuitry 106. The filtering circuitry 106 may search the base sensatory data for one or more machine-cognizable characteristics. The filtering circuitry 106 may then filter the base sensatory data in accord with the one or more machine-cognizable characteristics. Additionally or alternatively, the filtering circuitry 106 may send descriptors to profile generation circuitry 108. The descriptors may be based on the one or more machine-cognizable characteristics identified within the base sensatory data.

The filtering circuitry 106 may send the filtered sensatory data to the networking interface circuitry 104 for provision to communication circuitry 110 which may distribute the filtered sensatory data to an execution group. The execution group, for example, may include the workstations of volunteers or paid participants responding to a request. In some cases, the execution group may include a curated group maintained by a third party. For example, the Amazon® Mechanical Turk service may maintain a curated group of users which may perform human intelligence tasks on their workstations in an on-demand crowd-sourcing system. However, other crowd-sourced sensatory data analysis techniques may be implemented. The communication circuitry 110 may distribute the filtered sensatory data to the execution group by sending at least portions of the filtered sensatory data to terminals or accounts maintained by participants in the execution group.

Via the communication circuitry 110, the execution group may send descriptors in response to displays of the filtered sensatory data. The network interface circuitry 104 may receive the descriptors and pass the descriptors to the profile generation circuitry 108 for processing. The profile generation circuitry 108 may include processing logic blocks 122, 124, 126, 128, which may contextually analyze the descriptors in view of available metadata and previous profile states (122); extract predictors or behaviors, preferences and decisions (124); analyze the predictors to determine inferences regarding the recipient for later use (126); and determine actionable insights applicable to real-time interactions with the recipient (128). The analysis of the predictors may be in reference to relevant traditional data as discussed in more detail below.

Figure 2:
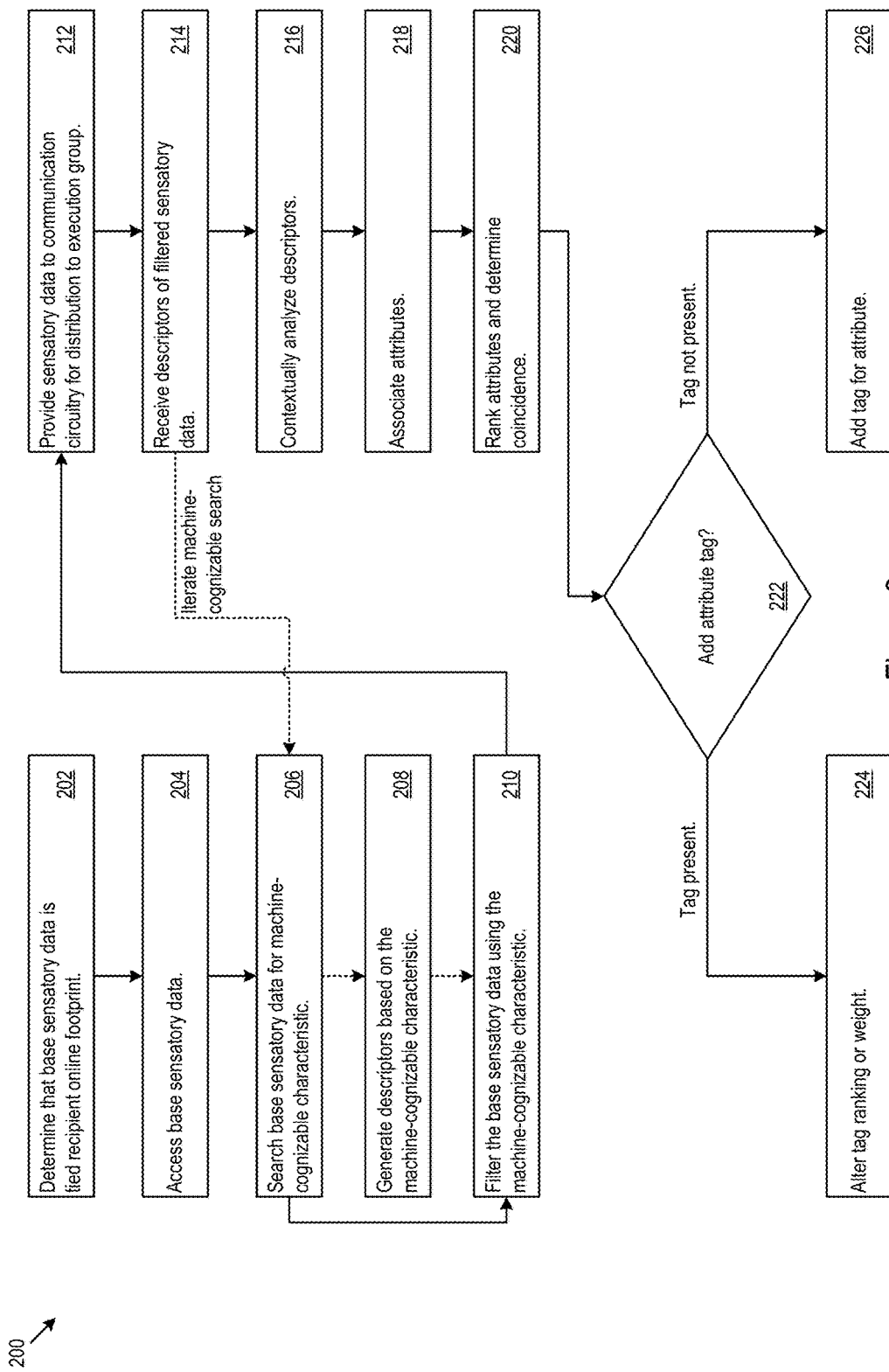
FIG. 2 shows example profile logic.

FIG. 2 shows example profile logic 200, which may be implemented on the profile circuitry 100. The profile logic 200 may determine that base sensatory data is tied to an online footprint of a recipient (202). For examples of data tied to a footprint as used herein, the profile logic may identify sensatory data posted using a social media account under the control of a recipient of interest. Additionally or alternatively, the profile logic may determine that sensatory data has been associated with the account by user tagging or other user actions identifying a particular recipient with particular sensatory data. In some cases, the sensatory data may be tied to the online footprint of a recipient because the recipient has viewed the sensatory data or performed searches returning the sensatory data. Account information, such as account history and recipient biographical data may be used to guide selection of sensatory data. Once the base sensatory data has been tied to the online footprint of the recipient, the profile logic 200 may access the base sensatory data (204). The profile logic 200 may search the base sensatory data for one or more machine-cognizable characteristics (206) to generate result sensatory data. In some cases, the profile logic 200 may generate descriptors of the base sensatory data (208) based on the machine-cognizable characteristics. Further, the profile logic may filter the base sensatory data to generate filtered sensatory data (210). For example, the profile logic 200 may combine result sensatory data from one or more searches to generate filtered sensatory data. In some cases, the profile logic 200 may combine result sensatory data with sensatory data selected based on metadata rather than content searches. The filtered sensatory data may be provided to communication circuitry for distribution to the execution group (212). Once the execution group receives the filtered sensatory data, the execution group may generate descriptors responsive to displays of the sensatory data and return the descriptors to the profile logic 200 via the communication circuitry.

The profile logic 200 may receive the descriptors (214), which may be complied with the descriptors generated in response to the machine-cognizable characteristics and other data collected for the recipient.

In some cases, after receiving descriptors from the execution group, the profile logic 200 may search the filtered sensatory data for additional machine-cognizable characteristics (206). The profile logic may generate additional descriptors relating to one or more portions of the filtered sensatory data (208), and (additionally or alternatively) send one or more portions of the filtered sensatory data to the communication circuitry for distribution to the execution group (212). Accordingly, in some cases, the profile logic may perform one or more iterations of machine-cognizable characteristic searching paired with execution group review. This may allow for coarse filtering followed by increasingly fine filtering or clustering analysis.

Further, the additional iterations may facilitate the operation of machine learning algorithms by the profile logic 200. The profile logic 200 may use the descriptors from execution group as feedback to confirm the accuracy of the machine-cognizable characteristic search.

In an example scenario, the profile logic 200 may filter base sensatory data using a first machine-cognizable characteristic, such as, a brand logo. The filtered sensatory data may be provided to the communication circuitry and distributed to the execution group. The execution group may return descriptors, which the profile logic may use to select a portion of the sensatory data for additional machine-cognizable characteristic searching. For example, the profile logic may select sensatory data with food-related descriptors. The profile logic 200 may filter the selected portion according to a second machine-cognizable characteristic, such as, the presence of people in an image. The filtered-selected portion of the sensatory data may then be distributed to the execution group for an additional round of descriptor generation.

The descriptors then may be contextually analyzed using metadata and previous profile states (216). The descriptors may also be evaluated alongside data received from multiple data channels, for example non-sensatory data channels, as discussed below with regard to recipient genomes (RGe). The descriptors may be used to associate attributes to the decision-predictive profile for the recipient (218). The assigned attributes may be ranked and analyzed for coincidence with other attributes (220). For example, particular attributes may be correlated with other attributes which may be suggestive of a causal relationship or common root cause relationship. For example, a recipient may engage in activity associated with a first attribute only after engaging in a first activity associated with another attribute that is time-correlated with the first. In an example scenario, a recipient may only patron a specific restaurant after attending a concert at a nearby auditorium. Example correlations may include time correlations and geographic correlations of attributes. Accordingly, attributes having coincidence with one another may have a coincident relationship.

Once the attributes are identified and ranked, the profile logic 200 may determine whether to add an attribute tag to the decision-predictive profile (222). If the decision-predictive profile already includes a tag for the attribute, the profile logic 200 may alter the tag ranking or weight (224). If the decision-predictive profile has not been previously tagged for the attribute, the profile logic 200 may add a tag for the attribute to the decision-predictive profile (226).

Figure 3:
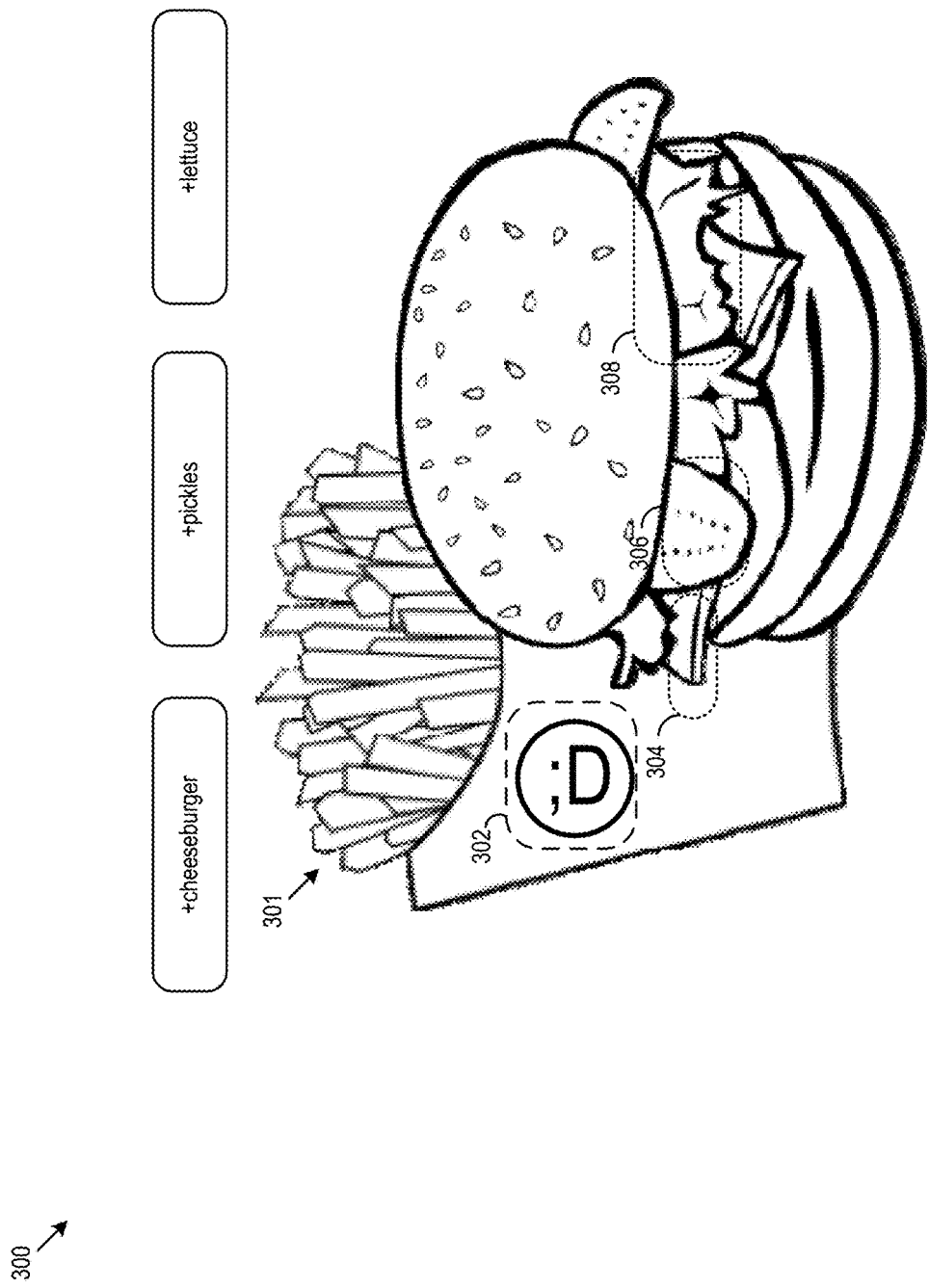
FIG. 3 shows an example analysis by profile logic of an image file.

FIG. 3 shows an example analysis 300 by profile logic 200 of an image file 301. In the example analysis 300 a machine-cognizable characteristic 302 is identified within the image file 301. In this case, the machine-cognizable characteristic 302 is a restaurant logo. The image file 301, having been filtered based on the machine-cognizable characteristic 302, was analyzed by the execution group. The descriptors "cheeseburger", "pickles", and "lettuce" were added based on the identifications 304, 306, 308 by the execution group.

Figure 4:
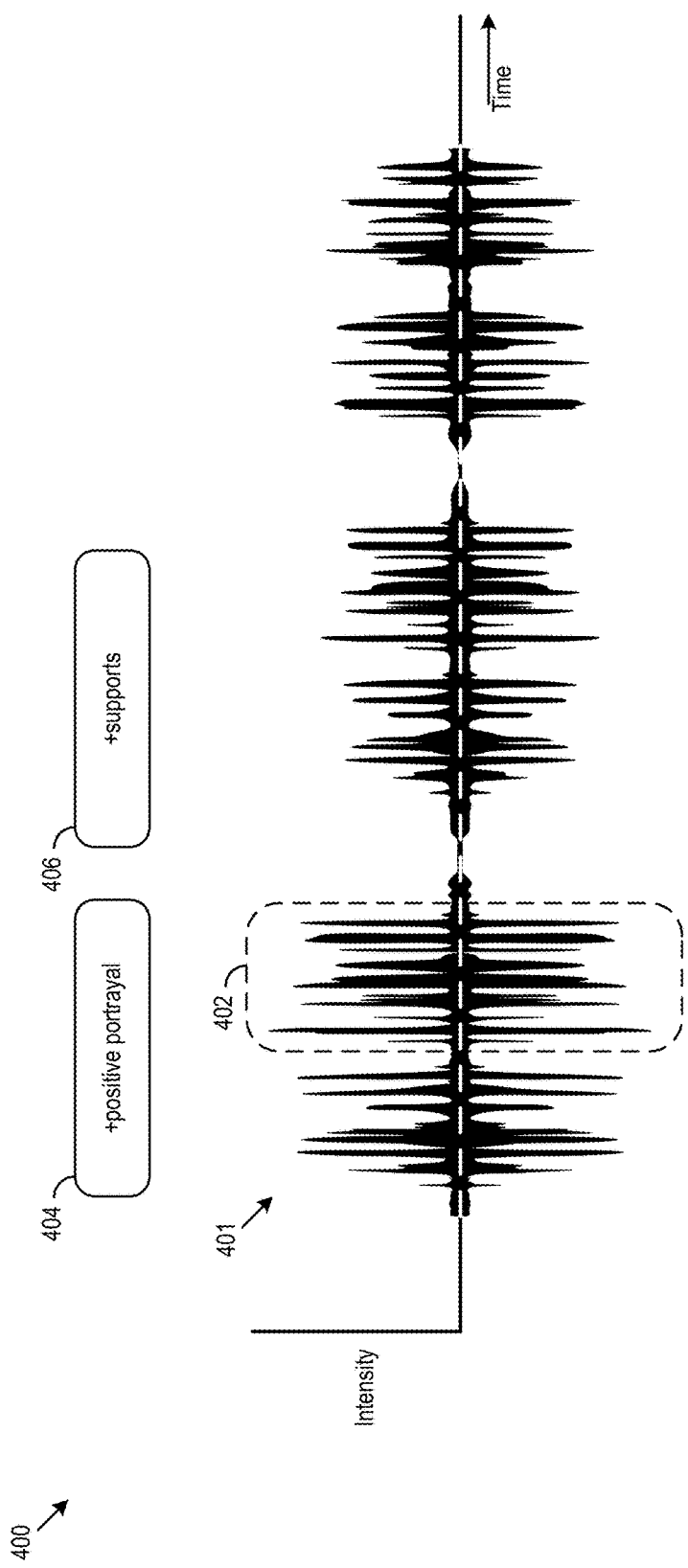
FIG. 4 shows an example analysis by profile logic of an audio file.

FIG. 4 shows an example analysis 400 by profile logic 200 of an audio file 401. In the example analysis 400 a machine-cognizable characteristic 402 is identified within the audio file 401. In this case, the machine-cognizable characteristic 402 is a spoken instance of a name of a politician. For example, the spoken instance may be identified through voice recognition analysis routines run as a part of the machine-cognizable characteristic search. The audio file, having been filtered based on the machine-cognizable characteristic 402, was analyzed by the execution group. The descriptors "positive portrayal" 404 and "supports" 406 were added by the execution group based on an overall impression from the audio file 401.

The decision-predictive recipient profile may be generated from data from a plurality of data channels including sensatory data channels, batch data, and stream data. The received data may include traditional data, alternate data, or a combination thereof. Processing the received data may involve matching the received data to a recipient and assigning a recipient identifier to the received data, and analyzing a selected portion of the received data to determine one or more attributes of the recipient. The determined attributes of the recipient may be ranked, and a determination may be made regarding which of the attributes should be tagged to the recipient. Corresponding tags may then be assigned to the recipient.

The processing of the data to determine attributes, rank attributes, and determine coincidence may include cross-referencing the selected portion of the received data with pre-analyzed data, and performing reconciliation of data received from multiple data sources. Reconciliation may involve determining whether one or more data objects in the received data contain information regarding a common attribute of the recipient and determining a level of trust of the one or more data objects based on the data source of that object, and based on the determined level of trust, the common attribute of the recipient may be adjusted. A determination may also be made as to whether a real-time update flag is present in the received data and where a real-time update flag is present, the decision-predictive recipient profile may be updated in real-time, but where a real-time update flag is not present the decision-predictive recipient profile may be updated through a batch update. The decision-predictive recipient profile may be updated periodically, on-demand, or in response to a trigger. For example, the architectures and techniques for genome management and generation discussed in U.S. patent application Ser. No. 14/351,187, filed Aug. 25, 2015, which is incorporated by reference in its entirety, may be used to process the descriptors for determination of actionable insights, recipient behavior profile development, and offer recommendation construction.

The RGe, for example a customer genome, may be thought of as the digital decision-making DNA of recipients. The RGe may be a complex data structure that includes a set of attributes with associated probabilities that may be derived from observational data received from real-time and batch data sources, which may be processed using statistical or mathematical models, along with contextual attributes that may be included in the data structure for variable amounts of time based on the time of data ingestion. In various implementations, the origin data used to determine the attributes and their context may include sensatory data. The RGe may be built from traditional and alternate data sources such that it represents an individualized portrait of a recipient, which may be used as the basis for providing personalized lifestyle or living services.

In various implementations, dynamic modifications may be made to the RGe. In some implementations the genome may be altered in near-real-time or real-time as information is ingested into the system. In this way, offers that are generated based on the genome may be immediately responsive to the needs of a recipient. For example, a recipient may be sent a discount on apparel if he/she walks by or idles nearby a clothing display including clothes similar to those which the recipient has discussed in audio recordings or has be depicted wearing in images.

In various implementations, the RGe may use sensatory data to support contextual recommendations. For example, if a recipient has been tagged in an image eating food similar to nearby offerings, a recommendation for the nearby offering may be sent to the recipient.

The system may also implement analysis of sensatory data to determine recipient health status and determine timing for lifecycle events. For example, images may be used to detect changes in personal grooming, such as the addition of facial hair. In another example, weight loss may be detected through sensatory data tied to a recipient's online profile. In some cases, recipients may be more receptive to change their pattern of behavior based on the occurrence of such events. This may make these events fortuitous times of recipient engagement for reasons, such as, acquisition, retention, and/or upselling.

Figure 5:
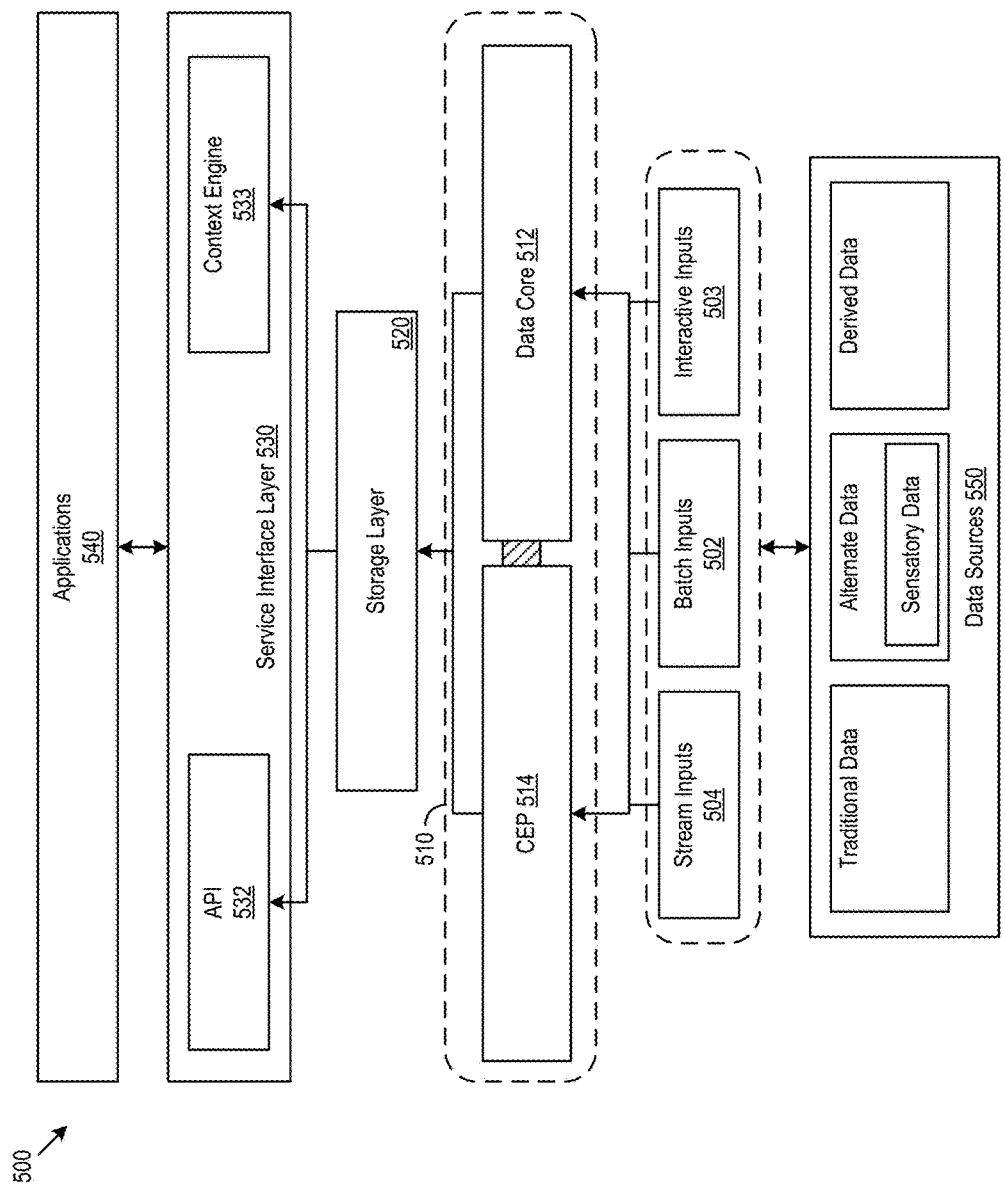
FIG. 5 shows an example Recipient Genome (RGe) system architecture.

FIG. 5 shows an example RGe system architecture 500. In the example RGe system architecture 500, data may be received by the analysis logic 510. The data may be received by the architecture 500 as streaming data 504, interactive data 503, and/or batch data 502. The analysis logic 510 may include a data core 512 and complex event processing (CEP) system 514. The data core 512 may receive data from data sources 550 for processing to support construction of the RGe as described below. The data core 512 may be responsible for creating the RGe and performing updates. The data core 512 may also produce offer recommendations using an offer recommendation algorithm.

The data core 512 may be implemented, for example, using a Hadoop distribution, which provides frameworks for reliable, scalable, distributed computing and data storage. As a more specific example, the data core 512 may be implemented with the Cloudera Hadoop distribution, using YARN, the architectural center of Hadoop, and HDFS, Hadoop's distributed filing system. The architecture is not thus limited and alternative computing and storage frameworks may be used.

The CEP system 514 may receive streaming data 504 for real-time and/or near-real-time processing with regard to inclusions or changes in the RGe. In various implementations, the batch data 502 processing may be implemented using computing frameworks (e.g., Apache Spark, an opensource framework) that support stream processing for the CEP system 514 (e.g., Spark Streaming module). Streaming data 504 may be delivered using a data stream that supports queueing. For instance, Kafka streams may be used to deliver streaming data 504, and Spark Streaming may be used to process these incoming Kafka streams.

The data core 512 and CEP system 514 may use the computing framework and stream processing modules (e.g., Spark and Spark Streaming) to process incoming data and create a unified image of the recipient, where converted recipient attributes form part of the RGe. The data core 512 and CEP system 514 may also process streaming data 504 in the provisioning of a particular offer. The data core 512 and CEP system may include the profile generation circuitry 108 (referring to FIG. 1), to support processing of the incoming RGe data. The recipient attributes may be determined based on certain enterprise rules, which may involve binary comparisons (e.g., True/False rules) or more complex analytics, for example, running the data against a particular model and assessing the resultant outcome. The data core 512 may also apply machine learning and natural language processing techniques to extract information from the raw data that is received.

In some implementations, the CEP system 514 may parse incoming streaming data 504 to detect specific items that may warrant an immediate change in a RGe or provisioning of a particular offer. For example, the CEP system 514 in processing streaming location data may recognize that a recipient has entered a particular geographic location or enterprise location, which may trigger a change in the RGe or cause an offer to be extended to the recipient. In a more complex scenario, the CEP system 514 may process streaming location data to track a recipient as they move around a store, and may be able to better understand how the recipient is moving. For example, the CEP system 514, in processing location data, may determine that the recipient walked through a certain path (e.g., from the entrance to aisle five, then through aisle eight) and stopped at a particular location (e.g., ultimately arriving at the frozen foods section). In order to avoid inundating the recipient with offers, which could alienate the recipient, the CEP system 514 may only trigger a response when the recipient stops, or is stationary, for a specified period of time. In some cases, the CEP system 514 can create or update a genome on its own. In some cases, the real-time processing capabilities of the CEP system 514 may be reserved for priority updates and RGe creation.

The storage layer 520 may support storage of RGes, recipient tags, and/or offer recommendations. In various implementations, the storage layer 520 may be an in-memory database. In other implementations, the RGe system architecture 500 may substitute an in-memory database for a distributed database, for example, using the Apache Cassandra cluster, which may reduce costs relative to in-memory storage. In some implementations, the database may be implemented using a relational database which may allow for changes as incoming data is received and analyzed.

In various implementations, the database may be modelled in such a way that data sources (e.g., streaming data 504 and batch data 502) are segregated from one another, so that different data sources may be processed independently. For instance, social media information (e.g., basic profile information and prior Facebook likes) may be uploaded as batch data 502, which may be processed and stored in one portion of the database, and social media streams (e.g., real-time conversations, audio files, videos) may be received as stream data 504, which may be processed and stored in another portion of the database. In this way, changes to the RGe may be written non-destructively, based on ingested data (e.g., stream data 504 or batch data 502), to respective portions of the database. This may be beneficial in instances where data is continuously ingested (e.g., stream data 504) over the speed of reading. In such implementations, where data source integrity in the database is maintained individually, information may be combined or aggregated when the RGe is ultimately read out (e.g., when requested by the service interface layer 530). Database records may also be partitioned by a recipient ID, which may be useful in high performance marketing automation use cases. Data may be redundantly stored in an aggregated form and may be read optimized for data analytics use cases.

The service interface layer 530 may include an API 532 and a context engine 533. The application programming interface (API) 532 may define the interfaces (e.g., function calls) for applications 540. For example, an application 540 may want the set of the most significant attributes for a particular recipient. In one implementation, for example, the application may request a list of the top three affinities (i.e., flavor preferences) for a particular recipient by invoking the following request: "GET genome-host:8080/api/v1/affinities?recipient-key=1&affinity-type=flavors&max-affinities=3" which may return the following recipient attribute data set: {"affinities": [{"value": "raspberry", "strength": 0.463},{"value": "vanilla", "strength": 0.108}, {"value": "chocolate", "strength": 0.078}]}. As another example, an application 540 may want a set of interactions (i.e., offers) that may be available for recommendation to a recipient. In one implementation for example, the application 540 may request the most relevant offer (i.e., coupon offer) for a particular recipient by invoking the following request: "GET genome-host:8080/api/v1/interactions?recipient-key=1&interaction-type=coupons&max-interactions=1" which may return a particular offer: {"interactions": [{"key": 1213, "href": "/api/v1/interactions/1213"}]}.

The context engine 533 may be implemented in the service interface layer 530 and may derive contextual states of a recipient by applying context rules to stored data retrieved from the storage layer 520, incoming data (e.g., stream data 504), or API request data accompanying requests received through the API 532. By way of example, the following API call may provide location information for a particular recipient: "PUT genome-host:8080/api/v1/context?recipient-id=1&context-key=location&context-value=3". The derived contextual states may be used to enable contextually specific marketing efforts, for example enabling real-time marketing automation. By way of example, the following API call may request the first ten recipients that are currently at a particular location (e.g., the grocery store) and have a particular tag (i.e., "chocolate lovers"): "GET genome-host:8080/api/v1/recipients?context-key=location&context-value=3&tag=chocolate%20lover&max-match=10" which may return the following recipient data set: {"recipient-matches": [1, 2, 3, 4, 10, 11, 24, 36, 37, 39]}.

In some implementations, the service interface layer 530 may be implemented as a REST API 532, which may be built using Node.js, where communication with the underlying systems may be abstracted by the REST API 532. The service interface layer 530 may be scalable, with optional limiting of functions on a per node basis. The service interface layer 530 may interface with the lower layers (e.g., the data core 512 and CEP system 514) and may handle most data analytic use cases, and may orchestrate real-time marketing automation or campaign targeting.

Recipient interactions, in general, may be characterized by a set of metadata that associates the interaction with targeting criteria. The metadata may point to a particular marketing campaign, content management system, or other integration (e.g., integrated social media platform). The targeting criteria, in turn, may reference particular recipient attributes, tags or contextual information stored in the RGe. The different recipient interactions may be enabled by custom or commercial integrated systems (e.g., twitter integration or SMS messaging integration), and the targeting criteria may be handled by the RGe and context engine 533. By way of example, an automated message (e.g., a tweet) may be sent by an integrated social media platform in response to a message (e.g., a tweet or Instagram post) received as a streaming data source. If, for example, the targeting criterion includes both a context criteria for a specific situation and a recipient tag criteria (e.g. "context: having a party" and "recipient tag : 'social media influencer'"), a particular offer may be sent to the recipient. In various implementations, the execution of a marketing campaign, having certain targeting criteria, in the service interface layer 530 may trigger a request for the current RGe, which may result in the data core 512 building or updating the RGe.

As explained above, the database may be modelled such that data sources are processed and stored separately, and may be assembled when a request for the RGe is received. More generally, data in the RGe may be stored in mutation groups depending on how it may be modified. When a request for the RGe is received, the different mutation groups may be read and a resultant value may be calculated, for example, by averaging the values of the different mutation groups or by adding the values of the different mutation groups together. In the case of data sources that are stored separately, processing the data sources may provide similar or related information, which may need to be combined together. For example, the result of processing batch data sources (e.g., in-store transaction history) may be combined with the result of processing a stream data source (e.g., streaming e-commerce transactions) to calculate a cumulative result (e.g., the total amount spent) or an averaged result (e.g., a raspberry flavor preference).

In other implementations, for example, where campaign targeting may respond to ingested data (e.g., stream data 504), the service interface layer 530 may periodically check to see if additional data has been received. For instance, a marketing campaign may be set to respond to social media messages (e.g., a Twitter message), for example, those having a particular identifier (e.g., "#summersale"), by providing an offer to the recipient. Because such marketing campaigns may not be contextually limited (e.g., as in a limited-time offer), periodically checking the social media stream data 504, for example, at five or ten minute intervals, may be sufficiently responsive. In other instances, for example, where campaign targeting relies on location-based signal data which may require a more timely response, incoming data may be checked against the campaign criteria in real-time. It may also be possible to process the remaining data sources in advance, so as to reduce the computation that may need to be performed in real-time, which may ensure a better quality of service.

Applications 540 may facilitate recipient interactions that are supported by the offer recommendations, recipient tags, and/or RGe in the storage layer 520. Recipient facing mobile and web applications 540 may be able to interact directly with the service interface layer 530, which may be exposed to the application 540 via an API 532 management platform or through an enterprise service bus (ESB). For example, a mobile application may want to access the RGe's content preferences API to filter the articles that are presented to the user via the mobile application. The mobile application may invoke an API call with an interaction-type of "article" where the set of articles that are returned may reference, or point to, the article stored in a content management system, which can then be displayed by the mobile application.

Management functions may performed through a management console, which may, allow for management of data ingestion, whether from batch data 502, interactive data 503, or streaming data 504 sources, and configuration and maintenance of the service interface layer 530, for example, to implement different marketing campaigns. The management console may be implemented through a light-weight dashboard, for example, using HTML5 that may be built using Ember.js.

The data sources 550 may include traditional data, alternate data which may include descriptors generated from sensatory data, and derived data. The descriptors generated from sensatory data may be determined from machine-cognizable characteristics within the sensatory data or from input from the execution group. Referring to FIGS. 1 and 5, the network interface circuitry 104, acquisition circuitry 102, filtering circuitry 106 may support the data sources operational block in obtaining sensatory data and managing descriptor reception from execution groups.

As described above, the system may provide for a structured approach to understanding an individual recipient and may build a RGe, having individual recipient profiles that describe various recipient attributes or traits. The RGe may be built by capturing data from traditional and alternative data sources, and may enhance or augment the recipient profile by using derived data. The traditional data sources may include, for example and without limitation, recipient demographic information, purchase history, and loyalty program data, alternate data sources may include, for example, social data, location-based data, or community-based data, and the derived data may provide static and/or dynamic insights regarding an individual that may be obtained based on an analysis of the traditional and alternate data. The derived data may include, for example, insights regarding how to engage with a particular recipient, their preferred engagement channel (online, mobile and in-store), their price sensitivity (e.g., average product price, coupon use, or participation in specific sale events) along with other influencers (e.g., celebrities, brands, family or friends) that capture recipient-specific traits.

Traditional data sources may include data sources that are traditionally used by enterprises to create marketing campaigns. As noted above, traditional data sources may include transactional or enterprise data, such as demographic information, product catalog data, point-of-sale transaction details, loyalty card data and recipient survey results. The transactional and/or enterprise data may be used to generate the outline of the RGe, which may be refined based on alternate data sources and derived data. In some implementations, a machine learning approach may be used to process traditional data. For example, a rule based machine learning approach may correlate transaction data (e.g., a recipient's purchase history) against other traditional data sources (e.g., demographic information). Machine learning models, for example, may be trained using transactional data for recipients with known demographic information, which may then be used to infer demographic information for anonymous recipient transaction data, for which no demographic information is available.

Traditional data sources may include data from different enterprise systems, including for example, internal customer relationship management (CRM) systems, enterprise resource planning (ERP) systems, ecommerce systems, and relational database management system (RDBMS) warehouses. As more specific examples, CRM and enterprise data may include data from warehouses, such as Oracle, IBM Netezza, Pivotal Greenplum and Teradata, enterprise resource planning and cloud-based applications, such as Salesforce.com and Marketo, NoSQL databases, such as, MongoDB, and documents and spreadsheets. Additionally or alternatively, recipient and market data may be available through companies that specialize in providing these services, which may serve as another data source. For example, Experian household or other reporting agencies may provide demographic and segmentation data, and Dun & Bradstreet or other market research firms may provide enterprise firmographic data. Public data, which may be available through governmental agencies (e.g., US Census Data), may also be used.

Alternate data sources may include data sources not commonly used today for recipient segmentation along with data that may fall beyond an enterprise's borders, for example, including data found on social media, community forums, and location-based information. For example, alternate data sources may include social media data from Facebook, Twitter, Foursquare, Instagram, Pinterest, Yelp, or Trip advisor, or community based forums (MacRumors.com, Slickdeals.net, FatWallet.com), or other popular consumer sites. This type of data, referred to generally herein as "social media" data, may be accessed using web crawling techniques or through social sign-on (e.g., Facebook application integration), and may help enterprises derive more powerful insights that may help in better understanding the behavior, attitudes and opinions of individual recipients. Additionally, social media may be a dense source of sensatory data, which may be ingested as discussed above.

Social media data (e.g., social media profile information) may be attached to the RGe, and may be processed to infer preferences of the recipient. In some implementations, a machine learning approach may be used to process the social media data, which may be able to identify recipient attributes based on a relatively small set of data inputs (e.g., 4-5 Facebook "likes"). In some implementations, the machine learning approach may be rule based, and may correlate transaction data (e.g., purchase information) against social medial data (e.g., Facebook "likes"). In addition, or in the alternative, a clustering algorithm may be applied to the social media data to identify relevant groups of people. In an example scenario, an enterprise may use social media data to derive a recipient's opinions from that recipient's closest social connections. For example, a restaurant trying to attract a new recipient could leverage the opinion of a prospective recipient's friends, for example, through the comments they make on the recipient's social media profile about their experience at the restaurant, in order to persuade the recipient to eat there. As another example, social media data may be used to understand how recipients prefer to engage with particular brands or products. For example, recipients might "like" and "share" products, but not comment on them, or they might enter in sweepstakes, but not redeem coupons. An enterprise may use these insights to sell a product, or work to increase recipient loyalty by appealing to an individual recipient's preferences.

In some systems, "likes" and "shares" of files containing sensatory data may be used to determine sensatory data tied to the online footprint of a recipient. Additionally or alternatively, sensatory data tied to the footprint of close connections may be used to enrich and expand the base sensatory data identified for a recipient. For example, an image "liked" by a threshold percentage of a recipient's connections or by a particular number of close connections may be appended to the base sensatory data of a recipient's online footprint.

Traditional and alternate data sources may be accessed in a variety of ways using different data transfer mechanisms, depending on the method of implementation to construct or update a RGe. In various implementations, batch data 502 sources may be delivered in the form of flat files for processing, and may be transferred to the data core 512 via an upload process through a management console. Batch data may include uploads of structured recipient data provided by CRM systems. Similarly, master data management (MDM) or merchandise systems may provide access to product catalog data. With regards to social media, batch or scheduled uploads of social media data (e.g., Facebook data) may be provided through a public facing interface (e.g., Facebook API). Streaming data 504 may be provided from e-commerce or point-of-sale systems, where the streaming data may include transactions and actions of a recipient. Streaming data 504 may also be provided through different public interfaces, for example, through Twitter's streaming API or Facebook's streaming API.

Figure 6:
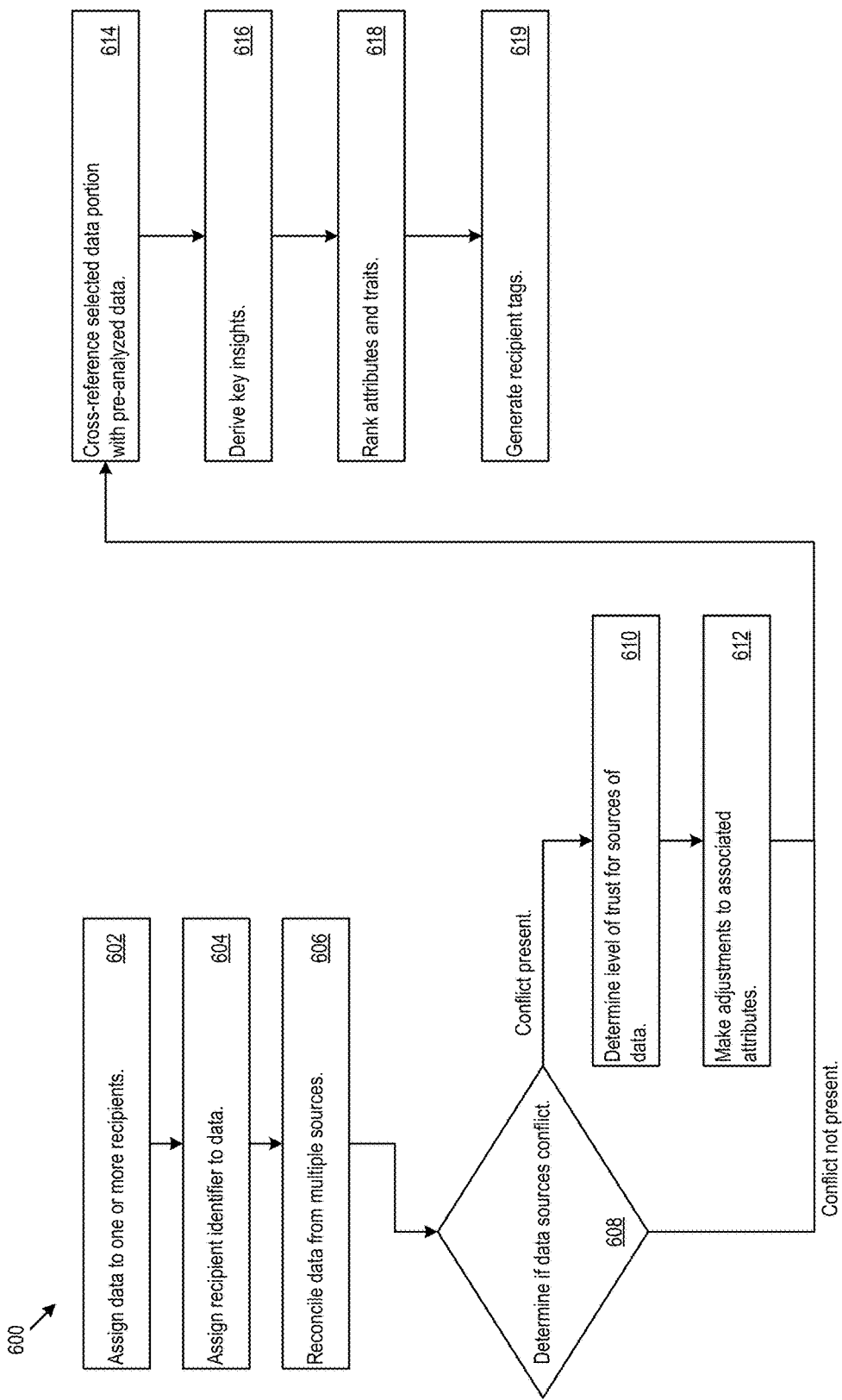
FIG. 6 shows example logic 600 for RGe construction.

FIG. 6 shows example logic 600 for RGe construction. Data, such as descriptors of filtered sensatory data, once received by the data core 512 or CEP system 514, may be assigned, matched, or attributed to one or more individuals for RGe updates (602). For example, the data core 512 or CEP system 514 may check for names, sources, and/or other identifiers to identify the one or more associated RGes. The data core 512 or CEP system 514 may then assign a recipient identifier to the data (604). Afterward, the date core 512 or CEP system 514 may extract attributes for the RGe from the data. By way of example, the extraction may be facilitated by first identifying the data source, and then determining a list of important attributes to extract from that particular data source.

Once the data core 512 or CEP system 514 extracts the important attributes, the logic may reconcile or prioritize data from multiple sources that may potentially describe the same recipient (606). The logic 600 may perform reconciliation and prioritization to ensure that the data core 512 and CEP systems 514 have the most accurate data on an individual recipient for inclusion in the RGe. Data prioritization can be done through enterprise rules. In some implementations, reconciliation and prioritization of ingested data may be performed by an orchestration engine.

The orchestration engine may first check to see if the two data objects are attributed to the same recipient and may determine whether the data objects contain information regarding the same descriptive attribute for the recipient (608). If there is a conflict, the orchestration engine may apply the enterprise rules to determine the level of trust for the sources of the data (610). Once, the levels of trust for each source are determined, the orchestration engine may make adjustments to the associated attributes accordingly (612). For example, the attribute from the most trusted source may be selected. As an example, a social media data object (e.g., a Facebook relationship status) may be deemed unreliable based on demographic information of the user (e.g., young recipients may use the relationship status field frivolously, for example, claiming to be "married" to a close friend), in which case information from a more reliable traditional data source (e.g., CRM system information) may be used to override the field. In other cases, the social media object (e.g., Facebook relationship status) may be deemed more reliable based on demographic information of the user (e.g., older recipients use the relationship status field purposefully) and may override information from traditional data sources (e.g., CRM system information). Additionally or alternatively, relative weights may be assigned to the conflicting attributes such that one attribute may have a larger effect than another attribute. In various implementations, the enterprise rules themselves may be assigned weights. In some cases, the more weight a given enterprise rule has, the more likely it is that the RGe will be updated in accordance with that enterprise rule. Moreover, in some cases, for example, where there is no conflict, the attributes in question may be left unchanged. Additionally or alternatively, data prioritization may be implemented on an active learning engine. To support the active learning engine the analytics system, may be implemented in a staging environment where the incoming data that has been selected for reconciliation is sent. Users may prioritize or edit the recipient data, and the active learning engine may monitor the user edits and/or re-prioritizations to determine the trust levels for different data sources and which sources are preferred for certain attributes or circumstances. In an example case, customer relationship management (CRM) data may be more trusted than Facebook data. In another example transactional data may be trusted more than demographic data. However, in various contexts, the opposite outcomes may be true and/or such sources may be trusted equally.

When a selected portion of the data has been analyzed, the ingested data may then be cross-referenced with pre-analyzed data (614). For example, pre-analyzed data may include attribute rules files, Facebook rules files, or other rules files. In an example scenario, the selected portion of the data may include batch data that has been sent to the data core 512 for processing, one or more flagged stream data items, and other data portions. The selected portion of the data, once cross-referenced with the pre-analyzed data, may undergo further analysis, which may facilitate derivation of key insights (616) about the consumer associated with the RGe being formed. Such insights could include product interests, product attribute preferences, recipient lifestyles, or favorite activities. The pre-analyzed data may be used to match recipient behaviors with interests and attributes. The attributization process takes raw data, for example, from stream data or batch data sources, as an input and converts the raw data into recipient attributes. The output is the RGe, which correlates attributes with an individual. For example, the pre-analyzed data may include aggregate recipient decision data. For example, such aggregate consumer decision data may include data points that 90% of recipients who buy product 'X' are interested in camping, or that 80% of people of who like Brand 'A' on Facebook are also interested in travelling.

Once recipient attributes have been calculated, the logic 600 uses enterprise logic to rank the attributes and traits (618) of an individual. The enterprise logic may incorporate the priorities of the entity that manages the RGe in ranking the attributes. For example, the enterprise logic may incorporate the enterprise goals of a company and/or its clients, and may prioritize recipient attributes in accordance with these goals.

As noted previously, the RGe architecture may also facilitate the creation of recipient tags. Recipient tags in contrast to derived data may be assigned to recipients based on an evaluation of all available data, whereas derived data may generally refer to an individual data point. In various implementations, the logic 600 may generate recipient tags by utilizing enterprise logic to determine which attributes are tagged to a recipient after derivations have been made (619). For example, some derived attributes may not be important for the strategies that a particular enterprise is seeking to implement, and the recipient may not be tagged. As a more specific example, a chain of luxury boat stores may not be interested in a recipient's preferences with regard to farming equipment. A derived attributed regarding the farming equipment area may not necessarily be tagged to a RGe maintained for a luxury boat store.

In various implementations, the RGe is dynamic and may be recalculated and/or updated periodically, on demand, in response to a trigger event, or at virtually any interval. In some implementations, for instance, the RGe may set a baseline seed value for an attribute, which may be subsequently updated as data specific to the recipient is ingested. For example, a recipient's age may be known (e.g., based on social media profile information) and may be used to set a seed value for a 'typical' recipient of that age. However, as previously noted, this top-down segmentation approach may not accurately capture the recipient's preferences or be predictive of the recipient's behavior. As additional data is received (e.g., subsequent transactional data), the baseline value may be adjusted, such that the attribute better characterizes the recipient. In some cases, the RGe may be updated in real-time or near real-time. In some cases, the RGe may be updated in a batch process. In some implementations, a RGe may be pulled, for example, based on a recipient identifier, from storage and compared with incoming data. Attributes and traits may be identified in the new data using the logic 600. If old data is available, the old and new data may be compared.

In various implementations, if a newly derived attribute or trait does not currently exist in a RGe, the attribute may be added to the RGe by the enterprise logic. However, in some cases, because the attribute is relatively new, the attribute may have a low certainty level attached relative to other older attributes. The certainty value of an attribute may be increased by the enterprise logic in response to a successful offer that was provided to the user based on the attribute. Additionally or alternatively, certainty may change based on time, confirmatory derivations from other sources, and/or other indications of certainty. In some case, the attribute may receive a new certainty value based on a determination by the enterprise logic that the new data may warrant a change in certainty value of an existing recipient attribute. An update to the certainty attached to an attribute may cause the enterprise logic to review the tagging information for the RGe.

Figure 7:
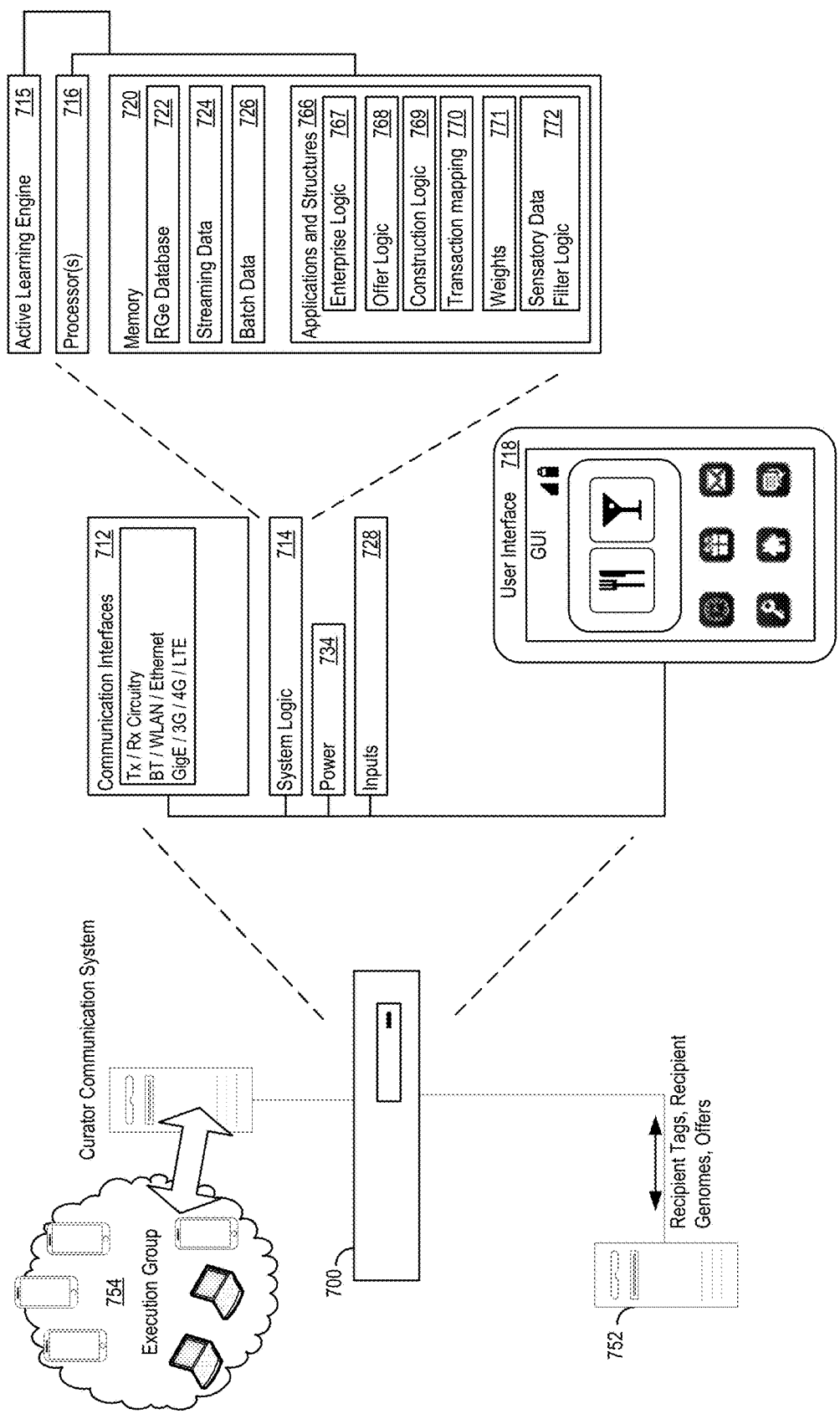
FIG. 7 shows an example specific execution environment.

FIG. 7 shows an example specific execution environment 700 for the logic (e.g. 200, 600), data core 512, CEP system 514, and/or other analysis systems described above. The execution environment 700 may include system logic 714 to support execution and presentation of the visualizations described above. The system logic may include processors 716, memory 720, and/or other circuitry. An active learning engine 715 may be implemented on the processors 716 and/or the memory.

The memory 720 may be used to store the RGe databases 722 and/or incoming streaming 724 or batch data 726 used in the, data analysis, RGe construction, recipient tagging, and/or offer recommendation described above. In some cases, the memory 720 may be implemented using a distributed file system over one or more storage systems. For example, a portion of the memory 720 may be implemented on a Hadoop distributed file system (HDFS). The memory may further include applications and structures 766, for example, coded objects, templates, or other structures to support data analysis, RGe construction, recipient tagging, and/or offer recommendation. The applications and structures may include the enterprise logic 767, the offer logic 768, the construction logic 769, the transaction mappings 770, enterprise rule weights 771, sensatory data filter logic 772. The memory may also support storage of elements obtained through external or third-party databases or data sources. In various implementations, the example execution environment 700, may connect to one or more databases 752 for storage of the offers, recipient tags, and/or RGes.

The execution environment 700 may also include commutation interfaces 712, which may support wireless, e.g. Bluetooth, Wi-Fi, WLAN, cellular (4G, LTE/A), and/or wired, Ethernet, Gigabit Ethernet, optical networking protocols. The communication interface may support communication with external or third-party servers 752, and exchange data and instructions to support review of sensatory data by execution groups 754. The execution environment 700 may include power functions 734 and various input interfaces 728. The execution environment may also include a user interface 718 that may include human interface devices and/or graphical user interfaces (GUI). The GUI may be used to present a management dashboard, actionable insights and/or other information to the user. In various implementations, the system logic 714 may be distributed over multiple physical servers and/or be implemented as a virtual machine.

Figure 8:
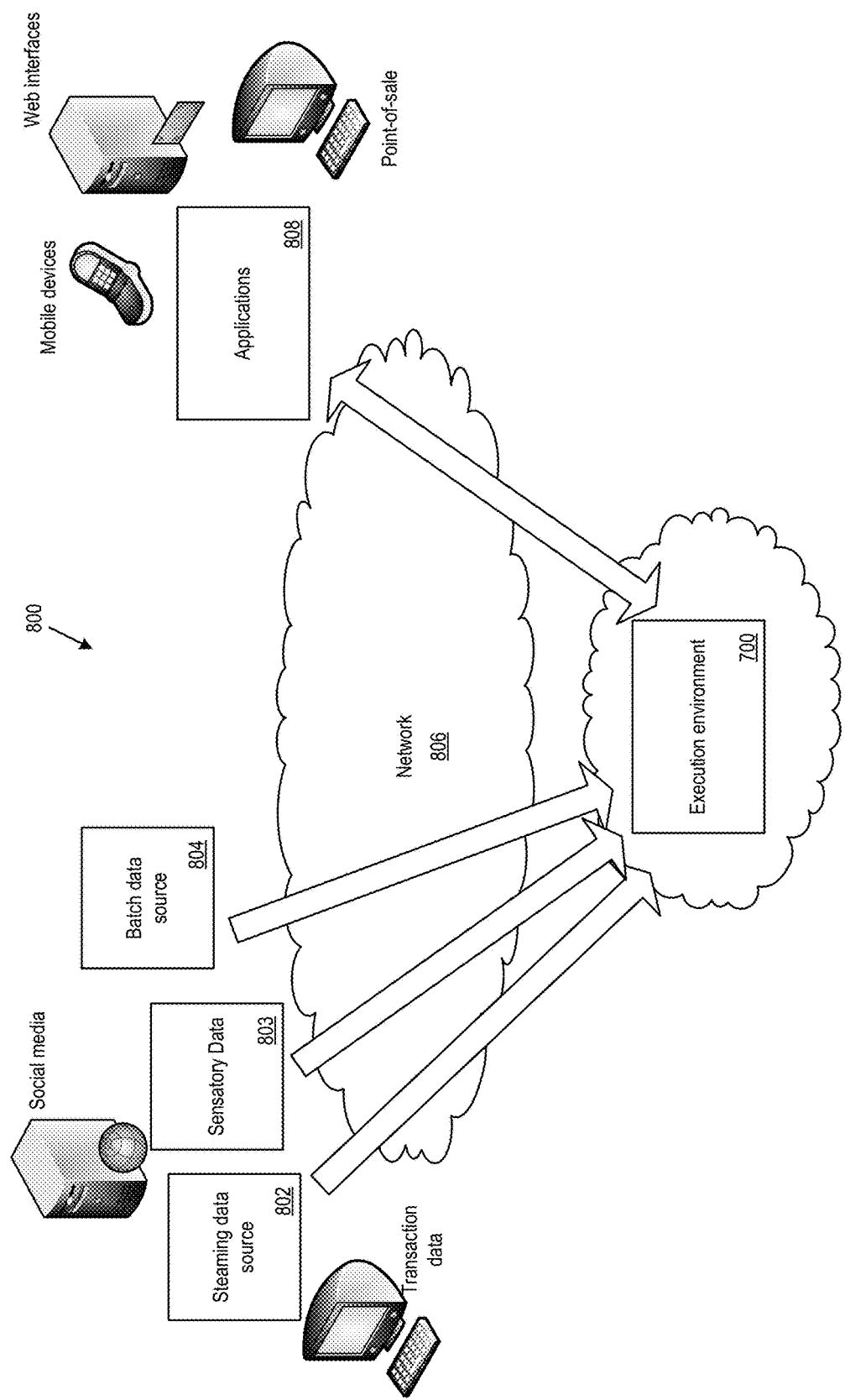
FIG. 8 shows an example network environment.

FIG. 8 shows an example network environment 800. Streaming 802, sensatory, and/or batch 804 data sources may provide input to an execution environment 700 running logic to support the RGe architecture. The data sources 802, 803, 804 may interface with the execution environment over a network 806 such as the Internet, a data center network, and/or other network. In some cases, the execution environment 700 may be distributed over a network to support the various functionalities of the RGe architecture. Applications 808 may access the insights, offers, tags, and/or other data of the RGe architecture via the network. Applications 808 may be run on devices such as RGe management devices, point-of-sale devices, recipient mobile devices, recipient web-interfaces, and/or other devices used in recipient interaction.

Figure 9:
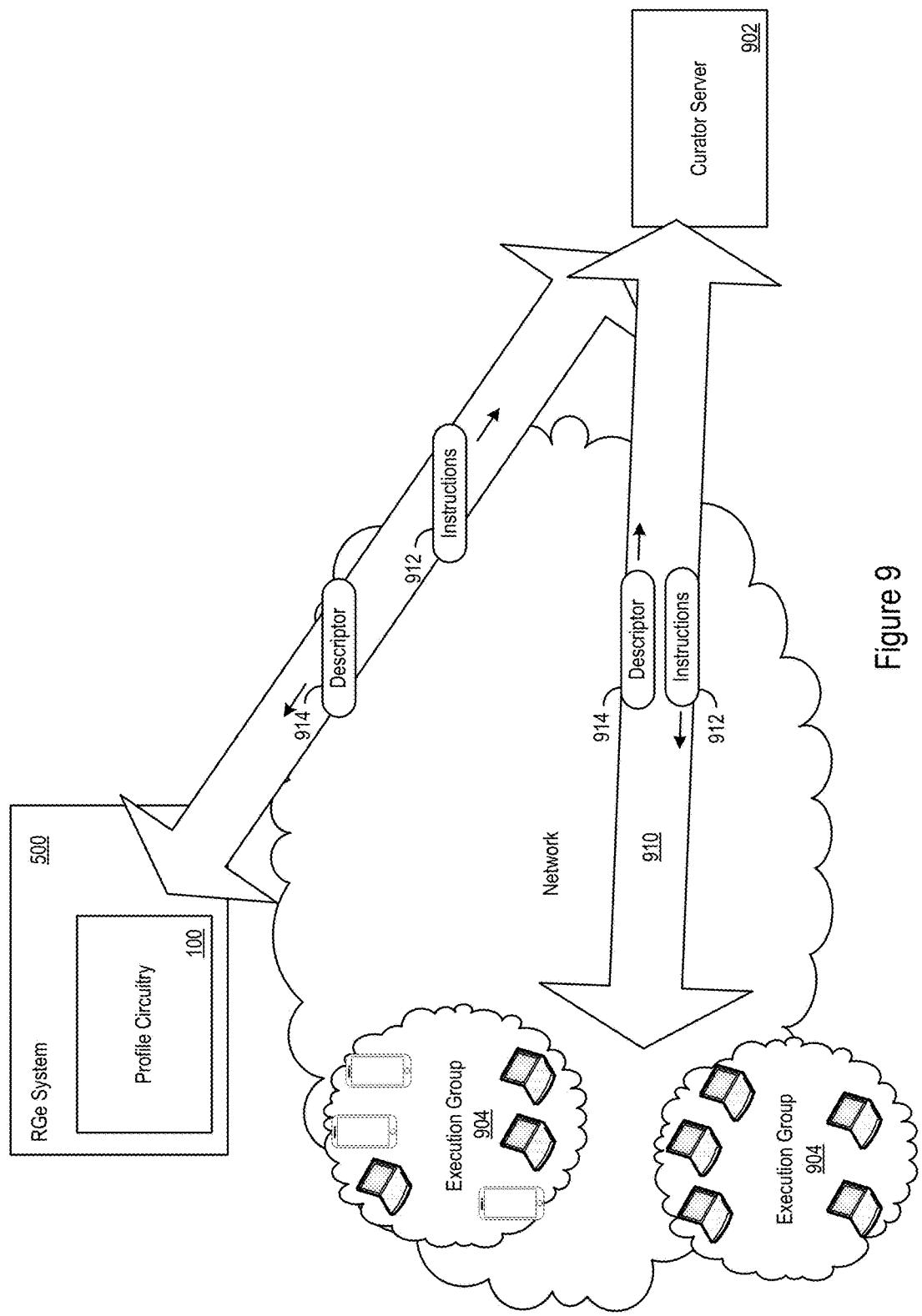
FIG. 9 shows an example processing environment for execution group review of sensatory data.

FIG. 9 shows an example processing environment for execution group review of sensatory data. A RGe system 500, including profile circuitry 100, may communicate with a curator server 902 or other curator communication system which may manage connections 910 and assignment instructions 912 for one or more execution groups 904. The execution groups 904 may include multiple members capable of human intelligence tasks, such as reviewing displays of sensatory data and generating descriptors 914 of the sensatory data. The descriptors 914 may be natural-language descriptors, selected from a menu of defined options, identifiers of pre-specified events or inclusions, or other human intelligence input. The descriptors 914 may be returned to the RGe system 500. In various implementations, groups of workers, which may serve as execution groups, may be managed, instructed, provisioned, and organized using the structures, environments, architectures, and techniques discussed in U.S. patent application Ser. No. 14/960,778, filed Dec. 7, 2015, entitled DATA PROCESSING TECHNIQUES, and Indian Provisional Patent Application Serial No. 1227/CHE/2015, filed Mar. 12, 2015, each of which being incorporated by reference in their entirety.

Figure 10:
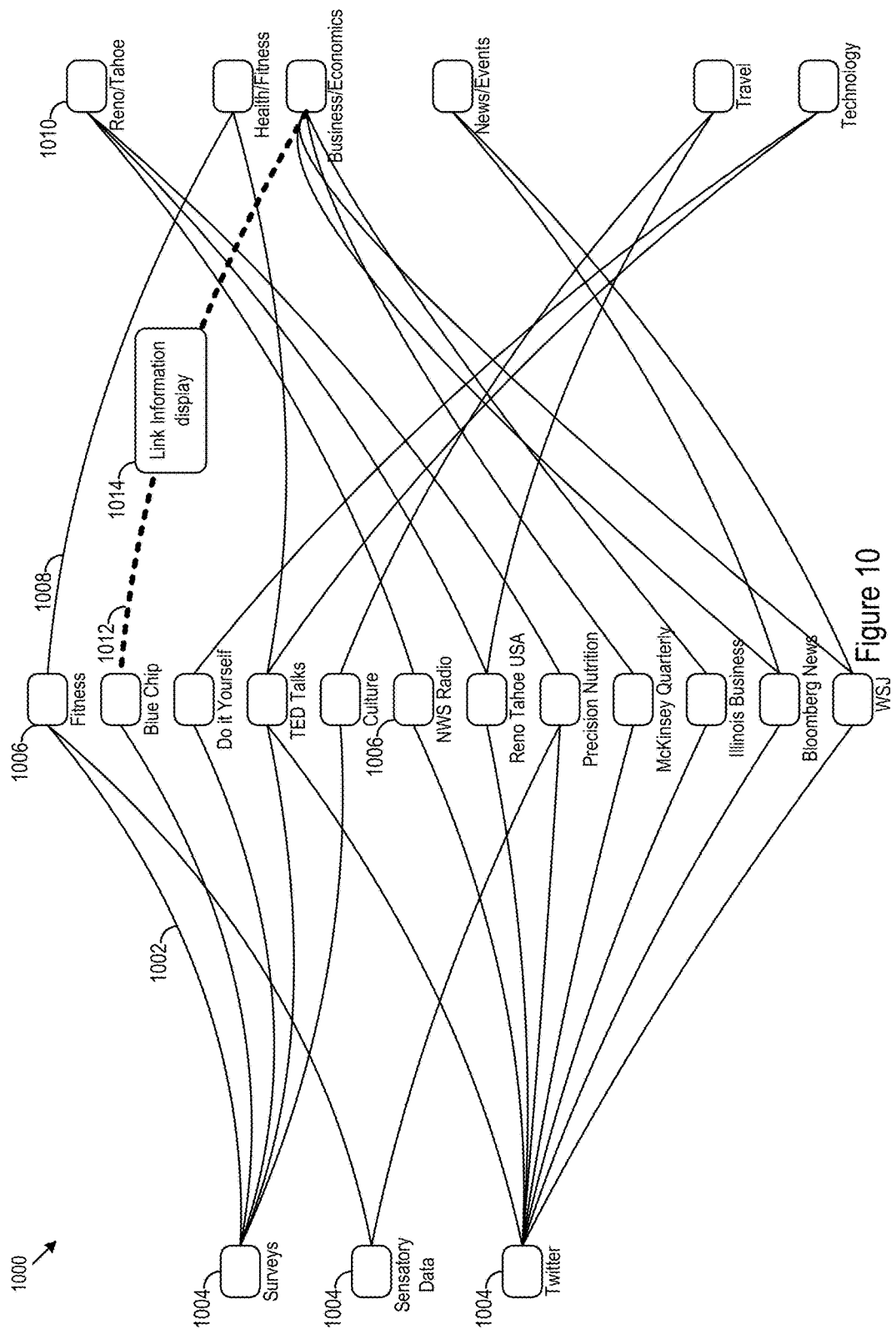
FIG. 10 shows an example visualization of a RGe.

FIG. 10 shows an example visualization 1000 of a RGe. The example visualization 1000 shows links 1002 from data sources 1004, such as sensatory data, to raw data 1006. The visualization also shows links 1008 to derived data 1010. Information displays 1014, such as tool tips, may be used to display information for selected links 1012 within the example visualization of the RGe. For example, the link information display may be used to show the confidence level associated with the selected link 1012.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible and may be readily ascertained by a person of ordinary skill in the art based on the teachings described above. These implementations and equivalents thereof are illustrated by the examples described above and the scope of the invention should be determined not by the examples but with reference to the claims and equivalents appended hereto.

What is claimed is:

1. A system comprising:
profile circuitry, including at least one processor, the profile circuitry configured to:
obtain base audiovisual data tied to an online footprint of a recipient;
search the base audiovisual data for a machine-cognizable characteristic to determine filtered audiovisual data from the base audiovisual data, the machine-cognizable characteristic including a commercial logo embedded within visual data within the base audiovisual data;
based on the search, generate an instruction to cause a curator communication system to distribute the filtered audiovisual data to a curated execution group, the instruction specifically referencing the filtered audiovisual data;
responsive to the instruction, receive from the curator communication system a descriptor of content of the filtered audiovisual data, the descriptor generated by and provided to the curator communication system by the curated execution group in response to display of the filtered audiovisual data; and
manage a decision-predictive profile for the recipient by:
assigning a recipient identifier for the decision-predictive profile to the descriptor;
analyzing the descriptor to determine an attribute of the recipient;
ranking the attribute of the recipient;
determining whether the attribute was previously tagged to the decision-predictive profile; and
when the attribute was not previously tagged to the decision-predictive profile, assigning a tag corresponding to the attribute to the decision-predictive profile; and
network interface circuitry, including at least one processor, the network interface circuitry in data communication with the profile circuitry, the network interface circuitry configured to send the instruction to the curator communication system.

2. The system of claim 1, where the network interface circuitry is configured to send that filtered audiovisual data to the curator communication system along with the instruction.

3. The system of claim 1, where the profile circuitry is configured to generate access information for the filtered audiovisual data to cause the curator communication system to access the filtered audiovisual data from a source of the filtered audiovisual data.

4. The system of claim 1, where the machine-cognizable characteristic further comprises audio of a spoken instance of a brand name.

5. The system of claim 1, where the profile circuitry is further configured to process the attribute for a coincident relationship with another attribute.

6. The system of claim 5, where the coincident relationship comprises a temporal proximity, a geographic proximity, a causal relationship, or any combination thereof.

7. The system of claim 1, where the filtered audiovisual data comprises an image file, an audio file, a video file, or any combination thereof.

8. The system of claim 1, where the profile circuitry is configured to select an excerpt from a file within the base audiovisual data to generate the filtered audiovisual data.

9. The system of claim 8, where the excerpt comprises a portion of the file proximate to the machine-cognizable characteristic.

10. The system of claim 9, where the profile circuitry is configured to determine a portion of the file is proximate to the machine-cognizable characteristic when the portion is within a temporal distance threshold, a spatial distance threshold, or both of the machine-cognizable characteristic.

11. The system of claim 1, where:
the profile circuitry is configured to search for multiple machine-cognizable characteristics; and
the filtered audiovisual data comprises result audio visual data from the search for the multiple machine-cognizable characteristics.

12. The system of claim 1, where the profile circuitry is configured to search the base audiovisual data for a machine-cognizable characteristic to determine filtered audiovisual data from the base audiovisual data by:
preforming a search for the machine-cognizable characteristic to generate result audiovisual data; and
processing the result audiovisual data and metadata for the base audiovisual data to determine the filtered audiovisual data.

13. The system of claim 12, where the profile circuitry is configured to process the result audiovisual data and metadata for the base audiovisual data by determining a coincident relationship between a result audiovisual data file and a base audiovisual file.

14. The system of claim 13, the coincident relationship comprises a temporal proximity, a geographic proximity, or both.

15. A method comprising:
obtaining base audiovisual data tied to an online footprint of a recipient;
applying a search function for a machine-cognizable characteristic to the base audiovisual data to determine result audiovisual data that includes a the machine-cognizable characteristic, the machine-cognizable characteristic including a commercial logo embedded within visual data within the base audiovisual data;
responsive to at least the result audiovisual data, determining filtered audiovisual data of the base audiovisual data;
based on the search function, sending the filtered audiovisual data to curator communication system with an instruction for distribution to a curated execution group, the instruction specifically referencing the filtered audiovisual data;
receiving from the curator communication system a descriptor of content of the filtered audiovisual data, the descriptor generated by and provided to the curator communication system by the curated execution group in response to display of the filtered audiovisual data; and
managing a decision-predictive profile for the recipient by:
assigning a recipient identifier for the decision-predictive profile to the descriptor;
analyzing the descriptor to determine an attribute of the recipient;
ranking the attribute of the recipient;
determining whether the attribute was previously tagged to the decision-predictive profile; and
when the attribute was not previously tagged to the decision-predictive profile, assigning a tag corresponding to the attribute to the decision-predictive profile.

16. The method of claim 15, further comprising determining that the base audiovisual data is tied to the online footprint of the recipient responsive to the base audiovisual data being posted using an account under control of the recipient.

17. The method of claim 15, further comprising determining that the base audiovisual data is tied to the online footprint of the recipient responsive to metadata for the base audiovisual data that identifies the recipient.

18. The method of claim 15, further comprising determining that the base audiovisual data is tied to the online footprint of the recipient responsive to a facial recognition search, voice recognition search, or both that identifies the recipient within at least a portion of the base audiovisual data.

19. A product comprising:
a non-transitory machine-readable medium;
instructions stored on the non-transitory machine-readable medium, the instructions, when executed, configured to cause circuitry to:
obtain base audiovisual data tied to an online footprint of a recipient;
apply an search function for a machine-cognizable characteristic to the base audiovisual data to determine result audiovisual data that includes a the machine-cognizable characteristic, the machine-cognizable characteristic including a commercial logo embedded within visual data within the base audiovisual data;
responsive to at least the result audiovisual data, determine filtered audiovisual data of the base audiovisual data;

based on the search function, send the filtered audiovisual data to curator communication system with an instruction for distribution to a curated execution group, the instruction specifically referencing the filtered audiovisual data;
receive from the curator communication system a descriptor of content of the filtered audiovisual data, the descriptor generated by and provided to the curator communication system by the curated execution group in response to display of the filtered audiovisual data; and
manage a decision-predictive profile for the recipient by:
assigning a recipient identifier for the decision-predictive profile to the descriptor;
analyzing the descriptor to determine an attribute of the recipient;
ranking the attribute of the recipient;
determining whether the attribute was previously tagged to the decision-predictive profile; and
when the attribute was not previously tagged to the decision-predictive profile, assigning a tag corresponding to the attribute to the decision-predictive profile.

20. The product of claim 19, where the filtered audiovisual data comprises an image file, an audio file, a video file, a tactile feedback pattern, or any combination thereof.

* * * * *